(12) United States Patent
Motomura et al.

(10) Patent No.: US 7,158,294 B2
(45) Date of Patent: Jan. 2, 2007

(54) LASER SCANNING CONFOCAL MICROSCOPE APPARATUS, IMAGE RECORDING METHOD, AND RECORDING MEDIUM

(75) Inventors: Shinji Motomura, Tokyo (JP); Tatsuo Nakata, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 13 days.

(21) Appl. No.: 10/310,657

(22) Filed: Dec. 5, 2002

(65) Prior Publication Data

US 2003/0128424 A1 Jul. 10, 2003

(30) Foreign Application Priority Data

Dec. 18, 2001 (JP) .............................. 2001-383952

(51) Int. Cl.
*G02B 21/06* (2006.01)

(52) U.S. Cl. .................................... 359/385; 250/459.1

(58) Field of Classification Search ................ 359/204, 359/385, 386, 388; 382/128, 312, 318, 321, 382/322, 323; 356/39
See application file for complete search history.

(56) References Cited

U.S. PATENT DOCUMENTS

| 5,127,730 | A | * | 7/1992 | Brelje et al. ................. 356/318 |
| 5,304,810 | A | * | 4/1994 | Amos ....................... 250/458.1 |
| 6,006,140 | A | * | 12/1999 | Carter .......................... 700/56 |
| 6,603,537 | B1 | * | 8/2003 | Dietz et al. ................... 356/39 |
| 6,878,948 | B1 | * | 4/2005 | Knebel ..................... 250/461.2 |

FOREIGN PATENT DOCUMENTS

JP 2749069 B2 2/1998

* cited by examiner

*Primary Examiner*—Mark A. Robinson
(74) *Attorney, Agent, or Firm*—Frishauf, Holtz, Goodman & Chick, P.C.

(57) ABSTRACT

An image recording method for use in a confocal laser scanning microscope apparatus is configured to scan a specimen with each of a plurality of laser lights at least having different wavelengths as spotlight, to detect the light from the specimen based on the spotlight, and to partition and record obtained image information.

18 Claims, 7 Drawing Sheets

LASER SCANNING CONFOCAL MICROSCOPE APPARATUS, IMAGE RECORDING METHOD, AND RECORDING MEDIUM

BACKGROUND OF THE INVENTION

1. Field of the Invention

The present invention relates to a confocal laser scanning microscope apparatus, which is suitable for a planar determinate quantity measurement, etc., for example, of ion concentration of a cell, its image recording method, and a recording medium on which its program is recorded.

2. Description of the Related Art

Conventionally, a confocal laser scanning microscope apparatus that narrows laser light from a light source into micro spotlight with an objective lens, scans an observation specimen with the spotlight, converts light from the observation specimen, such as transmitted light, reflected light, fluorescence, etc. into an electric signal with a photoelectric converter such as a photomultiplier, etc., and displays an observation image on an image monitor is known as a scanning microscope apparatus.

In the meantime, a method quantifying intracellular free ion concentration with an ion sensitivity indicator has become rapidly widespread as a study method in neuroscience and cell biology fields in recent years. By way of example, with a measurement of intracellular calcium ion concentration, a fluorescence measurement using a fluorescence dye fura-2, which is a calcium ion sensitivity indicator, for a sample cell is made. With the fluorescence measurement at this time, after a particular region of a cell is excited with two different wavelengths (340 nm and 380 nm), and a stimulus substance (Bradykinin) is given, quantification is made by obtaining a ratio of respective fluorescence intensities, and a change in the intensities is measured with a fluorescence spectrophotometer, observed with a microscope, or the like.

Additionally, Japanese Patent No. 2749069 proposes a fluorescence microscope apparatus that measures calcium ion concentration with the above described fluorescence dye fura-2. With this fluorescence microscope apparatus, only light having a wavelength transmitted by a switched filter among lights from a light source is irradiated on a sample by arbitrarily switching a plurality of interference filters whose transmission wavelengths are different, and a sample image is obtained by capturing and image-processing the light from the sample, so that a measurement using a plurality of lights having different wavelengths as excitation lights, like a 2-wavelength excitation 1-wavelength fluorescence measurement using the fluorescence dye fura-2, or the like can be made.

However, the above described proposal discloses not a configuration in the case where a measurement is made with a confocal laser scanning microscope apparatus, but only a configuration in the case where a normal optical microscope apparatus that optically obtains a two-dimensional image is used.

Additionally, no proposals are conventionally made as to a configuration in the case where a measurement using a plurality of lights having different wavelengths as excitation lights like a 2-wavelength excitation 1-wavelength fluorescence measurement, etc., which is applied to a calcium ion concentration measurement using the above described fluorescence dye fura-2, a hydrogen ion concentration measurement, a macromolecule concentration measurement, etc., is made with the use of a confocal laser scanning microscope apparatus.

SUMMARY OF THE INVENTION

An image recording method for use in a confocal laser scanning microscope apparatus, which is one aspect of the present invention, scans a specimen with each of a plurality of laser lights at least having different wavelengths as spotlight, detects light from the specimen based on the spotlight, and partitions and records obtained image information.

DESCRIPTION OF THE PREFERRED EMBODIMENTS

Hereinafter, preferred embodiments according to the present invention are described with reference to the drawings.

Figure 1:
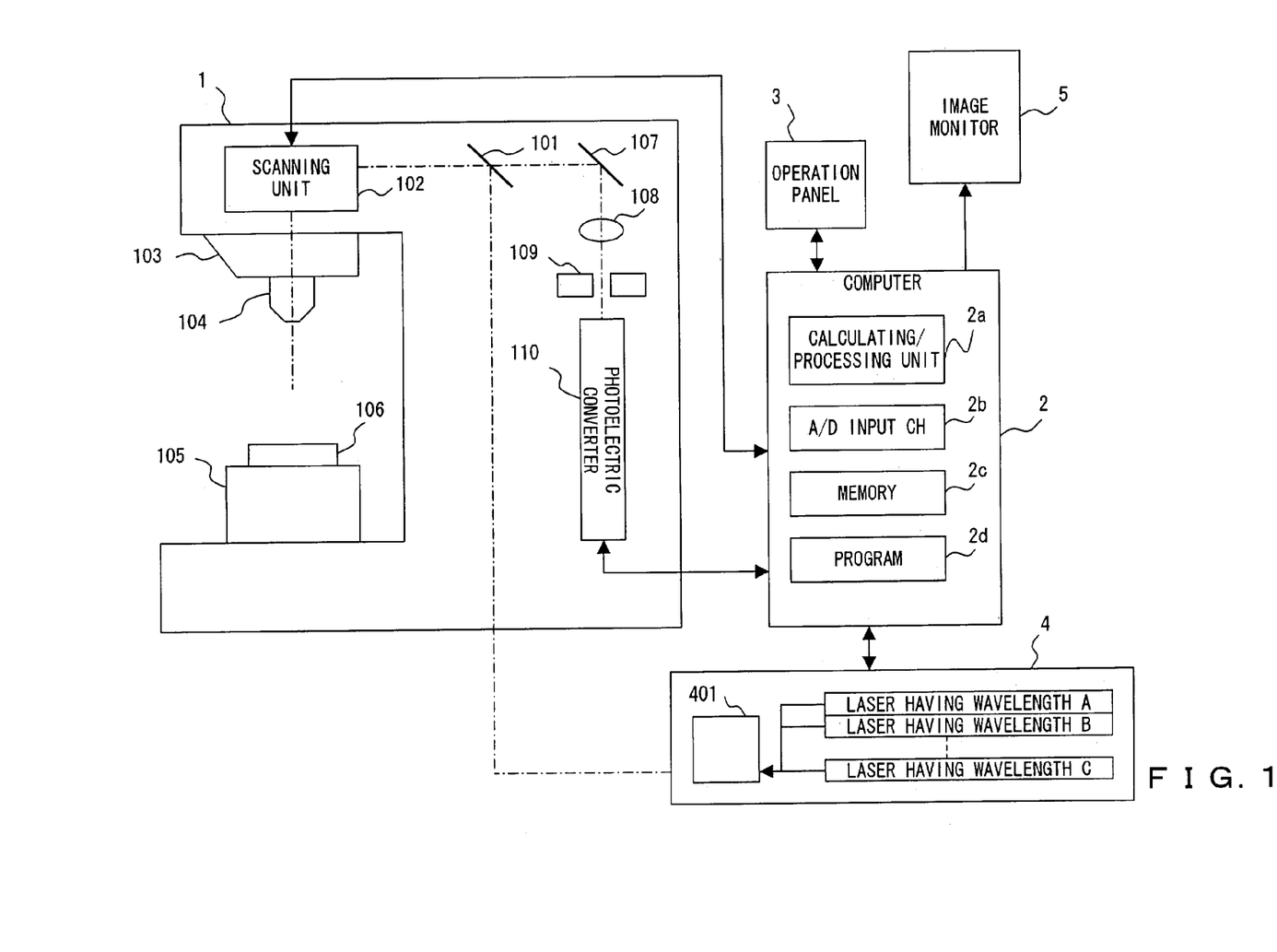
FIG. 1 exemplifies the configuration of a confocal laser scanning microscope apparatus according to a first preferred embodiment of the present invention.

FIG. 1 exemplifies the configuration of a confocal laser scanning microscope apparatus according to the first preferred embodiment of the present invention.

In this figure, the confocal laser scanning microscope apparatus according to this preferred embodiment is configured by comprising a confocal laser scanning microscope 1, a computer 2, an operation panel 3, a laser light source device 4, an image monitor 5, and the like. The confocal laser scanning microscope 1, the operation panel 3, and the laser light source device 4 are respectively connected to the computer 2.

The confocal laser scanning microscope 1 is configured by comprising an excitation dichroic mirror 101, a scanning unit 102, a revolver 103, an objective lens 104, a stage 105, a dichroic mirror 107, a lens 108, a confocal aperture 109, a photoelectric converter 110, and the like. In the confocal microscope 1, laser light input from the laser light source device 4 is reflected by the excitation dichroic mirror 101, and input to the scanning unit 102. The scanning unit 102 comprises a galvanometer mirror for scanning in the X axis direction, a galvanometer mirror for scanning in the Y axis direction, and the like. The scanning unit 102 scans the laser light reflected by the excitation dichroic mirror 101 in the X and the Y axes directions in accordance with a scanning control signal output from the computer 2, and outputs a scanning control termination signal to the computer 2 for each scanning for one line in the X axis direction. Or, the scanning control termination signal can be output for each scanning for one pixel depending on need. The laser light, which is scanned in the X and the Y axes directions by the scanning unit 102, is irradiated on an observation specimen 106 put on the stage 105 as spotlight via the objective lens 104 attached to the revolver 103. Light (reflected light, transmitted light, fluorescence, etc.) from the observation specimen 106 based on the spotlight is returned to the input optical path, reflected by the dichroic mirror 107, and gathered by the lens 108. At a position where the light is gathered by the lens 108, the confocal aperture 109 is arranged, and a confocal optical system is formed. Light which passes through the confocal aperture 109 is input to the photoelectric converter 110 such as a photomultiplier, etc., converted into an analog electric signal, and input to the computer 2.

The operation panel 3 comprises a pointing device such as a trackball, a joystick, a mouse, or the like. in addition to a keyboard. The operation panel 3 accepts various types of instructions from an observer, and notifies the computer 2 of an accepted instruction. The operation panel 3 accepts, for example, an instruction to start scanning laser light, an instruction to input an image, an instruction to adjust the sensitivity of the photoelectric converter 110, etc. from an observer, and notifies the computer of an accepted instruction.

The laser light source device 4 comprises a plurality of laser light sources which emit laser lights at least having different wavelengths, a laser light source switching device 401 including an optical element such as an AOTF (Acousto-Optic Tunable Filter), an AOM/EOM, etc., a shutter, and the like. The laser light source device 4 switches a laser light to be input to the confocal laser scanning microscope 1 under the control of the computer 2. The laser light is switched, for example, based on an instruction issued from an observer via the operation panel 3.

The image monitor 5 displays an image according to digital data output from the computer 2, a scanning menu, etc.

The computer 2 comprises a calculating/processing unit 2a, an A/D input CH 2b, a memory 2c, a recording medium (not shown) on which a control program 2d is recorded, and the like. The A/D input CH 2b converts an analog electric signal according to the observation specimen 106, which is output from the photoelectric converter 110, into a digital electric signal. The memory 2c has a memory region for position information, and an image memory region. In the memory region for position information, a scanning last line position (or a scanning last pixel position), and the like are stored. In the image memory region, the digital electric signal, which is A/D-converted by the A/D input CH 2b, namely, image information according to the observation specimen 106 is stored. For example, in the image memory region, image information corresponding to pixels of 1024 pixels by 768 pixels by 12 bits (4096 gradation) is stored. The calculating/processing unit 2a is so-called a CPU (Central Processing Unit), and controls the operations of the entire confocal laser scanning microscope apparatus according to the control program 2d recorded on the recording medium not shown. The calculating/processing unit 2a performs, for example, a process for outputting a scanning control signal to the scanning unit 102 according to the instruction to start scanning from an observer, which is notified via the operation panel 3, for making the A/D input CH2b convert an analog electric signal according to the observation specimen 106, which is output from the photoelectric converter 110, into a digital electric signal (image information) and transferring the digital electric signal to the memory 2c, for outputting the image information transferred to the memory 2c to the image monitor 5, for making the image monitor 5 display the image (observation specimen image) according to the image information, or the like. The calculating/processing unit 2a performs also a process for making the image monitor 5 display a scanning menu, etc. according to an instruction from an observer, which is notified via the operation panel 3, a process for setting the gain, the offset, etc. of the A/D input CH 2b, a process for setting the applied voltage, the gain, the offset, etc. of the photoelectric converter 110, a process for making the settings of the scanning unit 102, a process for making the settings of the laser light source device 4, such as a setting of laser light to be output, and the like.

Figure 2:
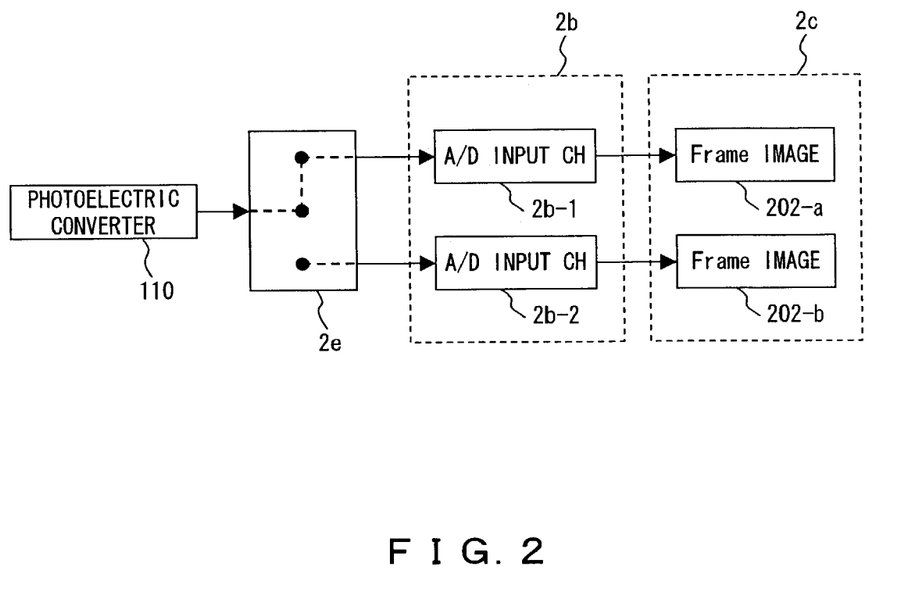
FIG. 2 exemplifies the configuration where an analog electric signal output from a photoelectric converter is converted into a digital electric signal by an A/D input CH, and transferred to a memory, according to the first preferred embodiment.

Next, the configuration where the analog electric signal output from the above described photoelectric converter 110 is converted into a digital electric signal by the A/D input CH 2b and transferred to the memory 2c is explained in further detail. In this preferred embodiment, it is assumed that the computer 2 is configured to be able to comprise a plurality of A/D input CHs 2b. In this example, two A/D input CHs 2b (2b-1 and 2b-2) are assumed to be comprised in correspondence with a 2-wavelength excitation 1-wavelength fluorescence measurement.

FIG. 2 exemplifies its configuration.

As shown in this figure, a signal branching/switching device 2e, which switches the output destination of the photoelectric converter 110 to either of the A/D input CHs 2b-1 and 2b-2 according to the switching state of laser light that the laser light source device 4 makes under the control of the calculating/processing unit 2a, is arranged between the above described photoelectric converter 110 and the A/D input CHs 2b. With such a configuration, the analog electric signal output from the photoelectric converter 110 is input to either of the A/D input CHs 2b-1 and 2b-2 according to the switching made by the signal branching/switching device 2e, converted into a digital electric signal, and transferred to the image memory region of the memory 2c. As a result, image information according to the light from the observation specimen 106 can be partitioned, for example, in frames (or lines, pixels, or the like), and stored in the memory 2c.

Although the signal branching/switching device 2e is comprised within the computer 2 in this example, it may be comprised externally to the computer 2.

Then, a control process performed by the confocal laser scanning microscope apparatus having the above described configuration is explained. Here, a 2-wavelength excitation 1-wavelength fluorescence measurement process using the fluorescence dye fura-2 is explained as one example of the control process. The calculating/processing unit 2a reads and executes the control program 2d recorded on the above described recording medium not shown, whereby this measurement process is implemented.

With this measurement process, various types of setting instructions for this measurement, such as an instruction to set two types of laser lights having different wavelengths, which are emitted from the laser light source device 4, instructions to set the gains and the offsets of the A/D input CHs 2*b*-1 and 2*b*-2, and the like are first accepted from an observer via the operation panel 3, and settings according to the respective instructions are made. In this example, it is assumed that laser lights having wavelengths A and B are instructed to be set as the two types of laser lights having different wavelengths, at this time.

Upon acceptance of an instruction to start scanning via the operation panel 3, the scanning unit 102 is controlled, and scanning of the observation specimen 106 is actually started.

Firstly, scanning for one frame is performed by irradiating the laser light having the wavelength A according to the switching control of the laser light source device 4, and image information of the one frame according to the light from the observation specimen 106 based on the laser light having the wavelength A is obtained. At this time, the signal branching/switching device 2*e* makes switching to input the analog electric signal, which corresponds to the light from the observation specimen 106 when the laser light having the wavelength A is irradiated, to the A/D input CH 2*b*-1 in correspondence with the switching state of laser light that the laser light source device 4 makes to irradiate the laser light having the wavelength A, and the digital electric signal (image information) A/D-converted by the A/D input CH 2*b*-1 is stored in the image memory region of the memory 2*c*. In this way, image information of one frame (Frame image 202-a) based on the digital electric signal (image information) output from the A/D input CH 2*b*-1 is stored in the image memory region of the memory 2*c*.

Then, scanning for one frame is performed by irradiating the laser light having the wavelength B according to the switching control of the laser light source device 4, and image information of the one frame according to the light from the observation specimen 106 based on the laser light having the wavelength B is obtained. At this time, the signal branching/switching device 2*e* makes switching to input the analog electric signal, which corresponds to the light from the observation specimen 106 when the laser light having the wavelength B is irradiated, to the A/D input CH 2*b*-2 in correspondence with the switching state of laser light that the laser light source device 4 makes to irradiate the laser light having the wavelength B, and the digital electric signal (image information) A/D-converted by the A/D input CH 2*b*-2 is stored in the image memory region of the memory 2*c*. In this way, image information of one frame (Frame image 202-b) based on the digital electric signal (image information) output from the A/D input CH 2*b*-2 is stored in the image memory region of the memory 2*c*.

Then, the Frame images 202-a and 202-b stored in the image memory region of the memory 2*c* are output to the image monitor 5. Then, images which correspond to the respective pieces of image information, namely, the specimen images, which are respectively obtained by irradiating the laser lights having the wavelengths A and B, are displayed on the image monitor 5. At the same time, a predetermined arithmetic operation is performed with these pieces of image information, and an image based on a result of the arithmetic operation is displayed on the image monitor 5.

For example, a ratio of image information (a ratio of luminance values, a ratio of intensities, etc.) is obtained by using these pieces of image information at this time, calcium ion concentration is obtained based on the ratio, and an image based on the obtained calcium ion concentration is displayed on the image monitor 5. Also an arithmetic operation such as an operation (luminance value of image information based on the laser light having the wavelength A-100)/(luminance value of image information based on the laser light having the wavelength B-1000), or the like is performed depending on need so as to even the luminance values of the respective pieces of image information when the ratio of the image information is obtained. Or, an arithmetic operation by a user request may be performed with these pieces of image information, and an arithmetic operation result or an image based on the arithmetic operation result may be displayed on the image monitor 5.

As described above, according to this preferred embodiment, the confocal laser scanning microscope apparatus that can make the 2-wavelength excitation 1-wavelength fluorescence measurement using the fluorescence dye fura-2 can be implemented. Additionally, a determinate quantity measurement for calcium ion concentration can be made almost in real time while performing an observation, although a lag by a time required to obtain image information of one frame occurs from when image information based on the laser light having the wavelength A is obtained until when image information based on the laser light having the wavelength B is obtained. Furthermore, a gain and an offset can be set for each of the A/D input CHs 2*b*-1 and 2*b*-2. Therefore, an adjustment of a gain and an offset, which are dedicated to laser light having each wavelength, for example, an adjustment such that a gain and an offset, which are dedicated to the laser light having the wavelength A, are set for the A/D input CH 2*b*-1, and a gain and an offset, which are dedicated to the laser light having the wavelength B, are set for the A/D input CH 2*b*-2 can be made. Consequently, images whose noises are further reduced can be obtained, so that a comparison between the images can be made more easily.

In this preferred embodiment, both of the Frame images 202-a and 202-b are output to the image monitor after being stored in the memory 2*c*. However, a previously stored Frame image may be output to the image monitor 5 earlier. In this way, an image can be displayed in more real time.

Additionally, in this preferred embodiment, the signal branching/switching device 2*e* may perform switching and control so that the analog electric signal based on the laser light having the wavelength A is output to the A/D input CH 2*b*-2, and the analog electric signal based on the laser light having the wavelength B is output to the A/D input CH 2*b*-1.

Furthermore, in this preferred embodiment, the configuration shown in FIG. 2 may be implemented by omitting, for example, the signal branching/switching device 2*e*, by setting the output destination of the photoelectric converter 110 to be directly the A/D input CHs 2*b*-1 and 2*b*-2, and by making a corresponding one of the A/D input CHs 2*b* perform A/D conversion based on a sampling clock set in the A/D input CHs 2*b*-1 and 2*b*-2. Or, this configuration may be implemented by making both of the A/D input CHs 2*b* perform A/D conversion, and by obtaining a digital electric signal to be used based on a correlation between converted digital electric signals.

Still further, in this preferred embodiment, the computer 2 comprises the two A/D input CHs 2*b*, and makes a measurement using two types of laser lights having different wavelengths as excitation wavelengths. However, the computer 2 may be configured to comprise three A/D input CHs or more. In that case, a measurement using three types or more of laser lights having different wavelengths as excitation wavelengths can be made.

Next, the second preferred embodiment according to the present invention is explained.

Figure 3:
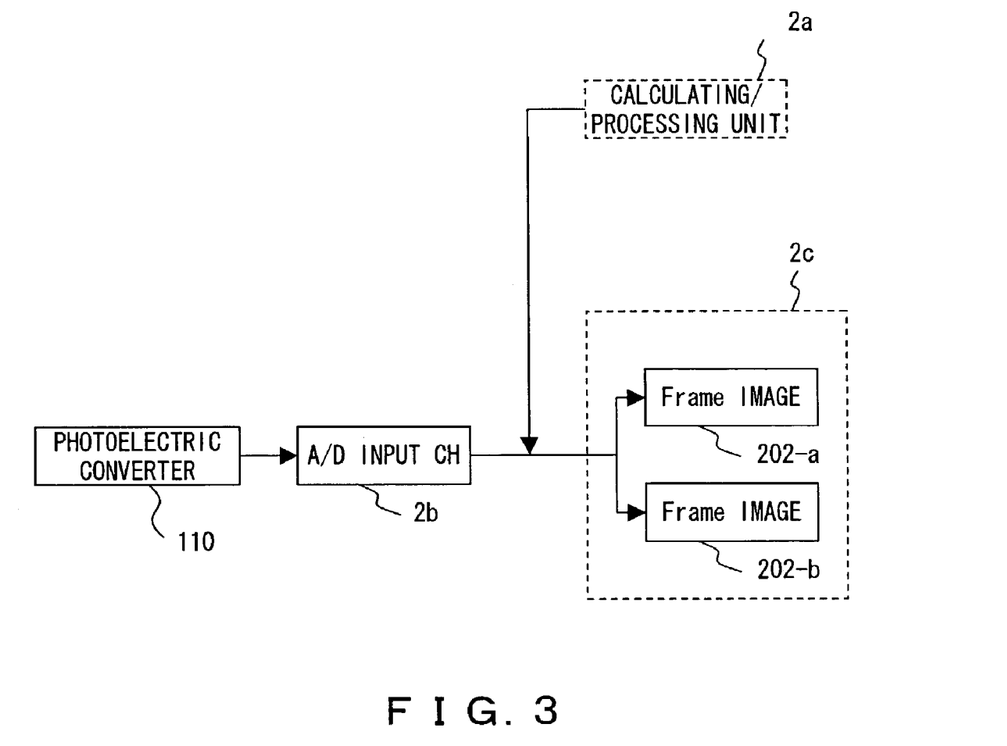
FIG. 3 exemplifies the configuration where an analog electric signal output from a photoelectric converter is converted into a digital electric signal by an A/D input CH, and transferred to a memory, according to a second preferred embodiment of the present invention.

In this preferred embodiment, a configuration where the analog electric signal output from the photoelectric converter 110 is converted into a digital electric signal by the A/D input CH 2*b* and transferred to the memory 2*c*, and its control process are different from those in the above described first preferred embodiment. Therefore, the configuration and the control process are explained here.

FIG. 3 exemplifies the configuration where the analog electric signal output from the photoelectric converter 110 is converted into a digital electric signal by the A/D input CH 2b and transferred to the memory 2c, according to the second preferred embodiment of the present invention.

As shown in this figure, the configuration differs from that shown in FIG. 2. Namely, a signal branch/switching device 2e is not comprised, and the output destination of the photoelectric converter 110 is only one A/D input CH 2b. Additionally, wavelength identification information indicating that light from an observation specimen 106, which is a basis of image information, is produced by laser light having which wavelength is attached to the image information of one frame based on the digital electric signal (image information), which is A/D-converted by the A/D input CH 2b, according to the switching state of laser light that the laser light source device 4 makes under the control of the calculating/processing unit 2a, and the image information to which the wavelength identification information is attached is stored in the memory 2c. As a result, the image information according to the light from the observation specimen 106 can be partitioned, for example, in frames (or lines, pixels, or the like), and stored in the memory 2c.

A control process performed by the confocal laser scanning microscope apparatus having such a configuration is explained next. Here, a 2-wavelength excitation 1-wavelength fluorescence measurement process using the fluorescence dye fura-2 is explained as one example of the control process. The calculating/processing unit 2a reads and executes the control program 2d recorded on the above described recording medium not shown, whereby this measurement process is implemented.

With this measurement process, various types of setting instructions for this measurement, such as an instruction to set two types of laser lights having different wavelengths, which are emitted from the laser light source device 4, and the like, are first accepted from an observer via the operation panel 3, and settings according to the respective instructions are made. Also in this example, it is assumed that laser lights having wavelengths A and B are instructed to be set as two types of laser lights having different wavelengths.

Upon acceptance of an instruction to start scanning via the operation panel 3, the scanning unit 102 is controlled, and scanning of the observation specimen 106 is actually started.

Firstly, scanning for one frame is performed by irradiating the laser light having the wavelength A according to the switching control of the laser light source device 4, and image information of the one frame according to the light from the observation specimen 106 based on the laser light having the wavelength A is obtained. At this time, wavelength identification information (such as CH1) indicating that the image information (?) is based on the laser light having the wavelength A is attached by the calculating/processing unit 2a to the image information (Frame image 202-a) of the one frame based on the digital electric signal (image information) corresponding to the light from the observation specimen 106 based on the laser light having the wavelength A in correspondence with the switching state of the laser light that the laser light source device 4 makes to irradiate the laser light having the wavelength A, and the image information to which the wavelength identification information is attached is stored in the memory 2c.

Then, scanning for one frame is performed by irradiating the laser light having the wavelength B according to the switching control of the laser light source device 4 in a similar manner, and image information of the one frame according to the light from the observation specimen 106 based on the laser light having the wavelength B is obtained. At this time, wavelength identification information (such as CH2) indicating that the image information is based on the laser light having the wavelength B is attached to the image information (Frame image 202-b) of the one frame based on the digital electric signal (image information) corresponding to the light from the observation specimen 106 based on the laser light having the wavelength B in correspondence with the switching state of the laser light that the laser light source device 4 makes to irradiate the laser light having the wavelength B, and the image information to which the wavelength identification information is attached is stored in the memory 2c.

As described above, wavelength identification information is attached, whereby it can be identified later that image information stored in the memory 2c is based on laser light having which wavelength, and the image information can be classified.

Subsequent processes are similar to those in the above described first preferred embodiment. However, in the second preferred embodiment, a display of an image on the image monitor 5, and an arithmetic operation using image information, such as a calculation (including recalculation) of a ratio of image information (a ratio of luminance values and a ratio of intensities) for a determinate quantity measurement of calcium ion concentration, or the like is performed based on wavelength identification information attached to the image information.

As described above, according to this preferred embodiment, the confocal laser scanning microscope apparatus that can make the 2-wavelength excitation 1-wavelength fluorescence measurement using the fluorescence dye fura-2 can be implemented with a smaller configuration, whereby the cost of the apparatus can be further reduced. Additionally, a determinate quantity measurement of calcium ion concentration can be made almost in real time while performing an observation, although a lag by a time required to obtain image information of one frame occurs from when image information based on the laser light having the wavelength A is obtained until when image information based on the laser light having the wavelength B is obtained. Furthermore, since the signal branching/switching device 2e in the first preferred embodiment is not comprised, a processing time loss caused by scanning switched by the signal branching/switching device 2e in a hardware manner can be prevented.

This preferred embodiment is explained by taking the 2-wavelength excitation 1-wavelength fluorescence measurement as an example. As described above, wavelength identification information for identifying that image information is based on which laser light is attached to the image information of one frame, which is stored in the memory 2c. Therefore, it goes without saying that this preferred embodiment is applicable also to a measurement using three types or more of laser lights having different wavelengths as excitation wavelengths.

Next, the third preferred embodiment according to the present invention is explained.

Figure 4:
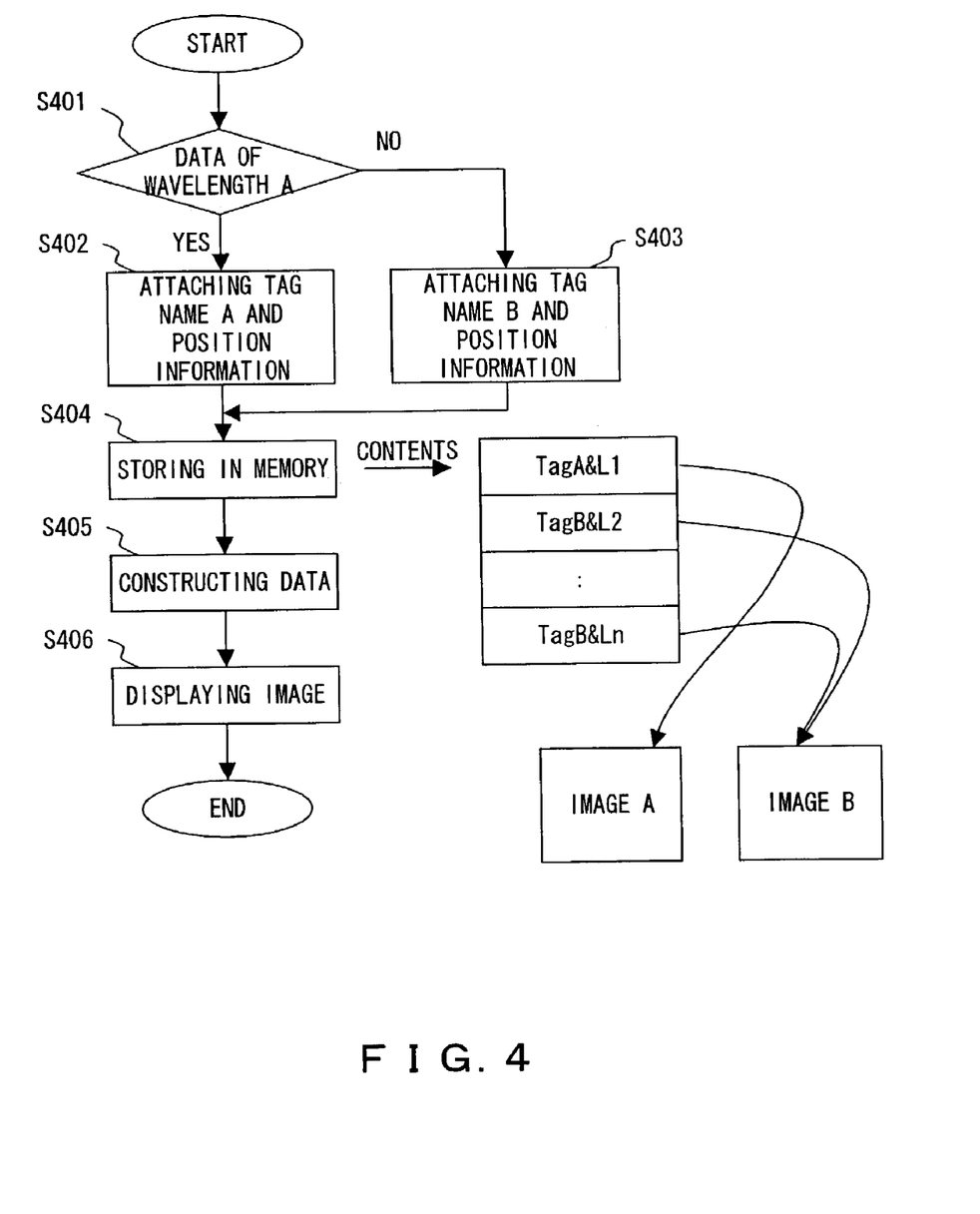
FIG. 4 is a flowchart showing the contents of a 2-wavelength excitation 1-wavelength fluorescence measurement process according to a third preferred embodiment of the present invention.

Although the configuration of this preferred embodiment is the same as that of the above described second preferred embodiment, its control process is different. Therefore, a 2-wavelength excitation 1-wavelength fluorescence measurement process using the fluorescence dye fura-2 is explained as one example of the control process here. The calculating/processing unit 2a of the computer 2 reads and executes the control program 2*d* recorded on the above described recording medium not shown, whereby this measurement process is implemented.

FIG. 4 is a flowchart showing the contents of the 2-wavelength excitation 1-wavelength fluorescence measurement process using the fluorescence dye fura-2, according to the third preferred embodiment of the present invention.

The flow shown in this figure is a process started when an instruction to start scanning is accepted after various types of instructions for this measurement, such as an instruction to set two types of laser lights having different wavelengths, which are emitted from the laser light source device 4, and the like are accepted from an observer via the operation panel 3. Also in this example, it is assumed that laser lights having wavelengths A and B are instructed to be set as the two types of laser lights having different wavelengths.

In this figure, firstly, in S401 to S404, the laser lights having the wavelengths A and B are alternately irradiated for each scanning for one line according to the switching control of the laser light source device 4, and a digital electric signal (image information) corresponding to the light from the observation specimen 106 when the scanning for one line based on the laser light having the wavelength A is performed, and a digital electric signal (image information) corresponding to the light from the observation specimen 106 when the scanning for one line based on the laser light having the wavelength B is performed are alternately stored in the image memory region of the memory 2*c*. In this case, the scanning based on the laser light having the wavelength A, and the scanning based on the laser light having the wavelength B are performed for the same line. Namely, after the scanning based on the laser light having the wavelength A is performed for one line, the scanning based on the laser light having the wavelength B is performed for the same one line. After the scannings are terminated, they are performed for the next one line in a similar manner. Such scannings for one line are repeated until one frame has been scanned. Additionally, if image information of one line based on a digital electric signal (image information) corresponding to the light from the observation specimen 106 when the scanning for one line is performed is stored in the image memory region of the memory 2*c*, identification information including a tag for identifying laser light having which wavelength and position information for identifying image information of which line is attached to the image information, which is then stored. The tag is determined according to the switching state, etc. of laser light that the laser light source device 4 makes, and the position information is determined according to a scanning control termination signal, or the like transmitted from the scanning unit 102. For example, identification information, which indicates that image information is on the basis of the scanning for the 1st line based on the laser light having the wavelength A, becomes Tag A&L1, CH1-L1, or the like (see this figure). In this case, Tag A and CH1 are a tag which indicates that the image information is based on the laser light having the wavelength A, and L1 is position information which indicates the image information of the 1st line.

In S405, data of image information (an image A shown in this figure) of one frame based on the laser light having the wavelength A, and data of image information (an image B shown in this figure) of one frame based on the laser light having the wavelength B are constructed with the image information of each line based on the identification information attached to the image information of each line stored in the image memory region of the memory 2*c* in the above described S401 to S404.

In S406, the image information of one frame based on the laser light having the wavelength A, and the image information of one frame based on the laser light having the wavelength B, which are constructed in the preceding step, are output to the image monitor 5, and images respectively corresponding to the respective pieces of image information are displayed on the image monitor 5. At the same time, the predetermined arithmetic operation referred to in the first preferred embodiment is performed with these pieces of image information and an image based on a result of the arithmetic operation is displayed. Upon termination of the process in this step, this flow is completed.

This flow is executed as described above, whereby the 2-wavelength excitation 1-wavelength fluorescence measurement using the fluorescence dye fura-2 is made.

Figure 5:
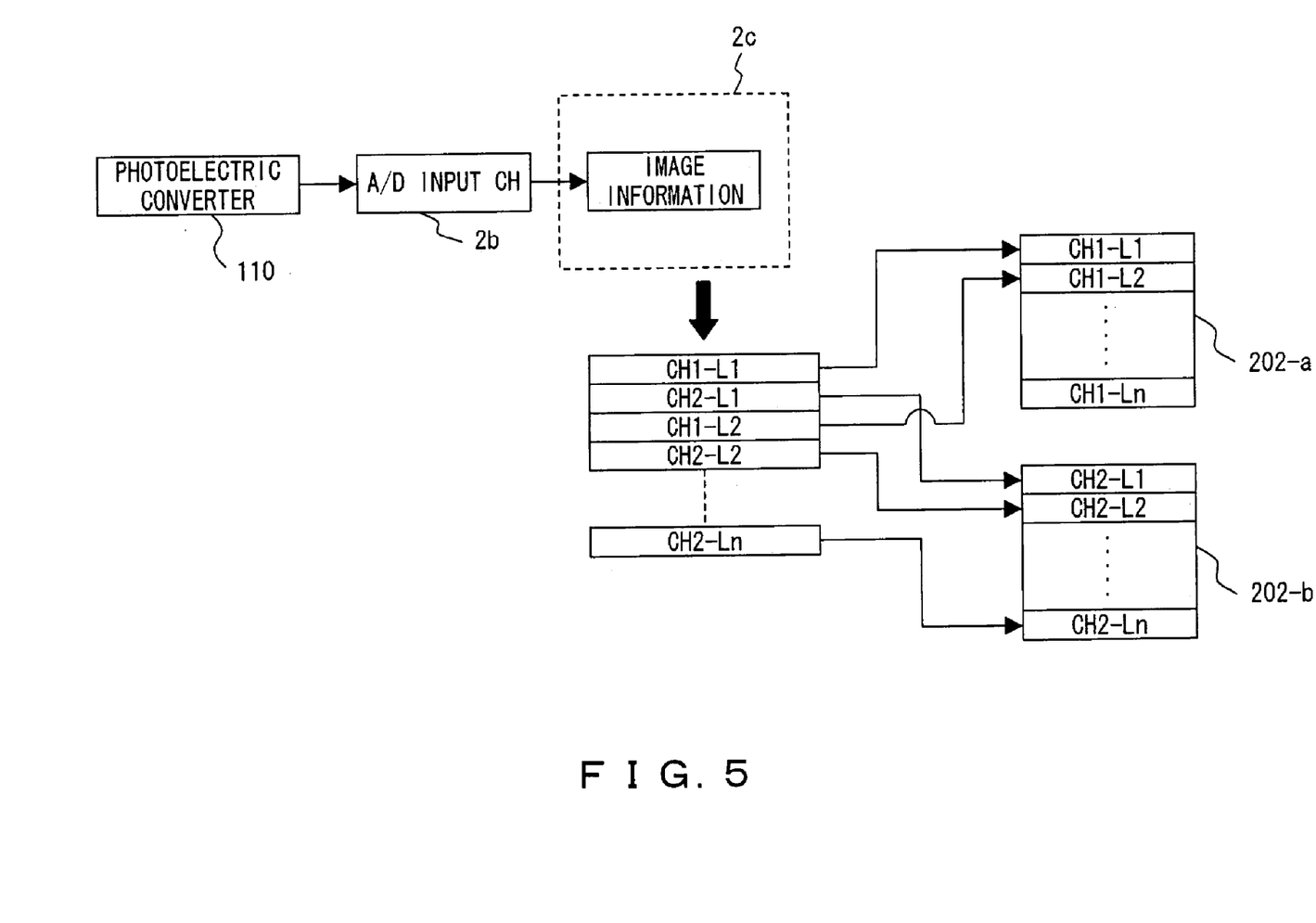
FIG. 5 exemplifies the data construction of image information of one frame.

An example of data construction of image information of one frame, which is explained in the process in the above described S405, is further explained in detail.

FIG. 5 exemplifies the data construction of the image information of one frame.

As shown in this figure, a process for converting the light from the observation specimen 106 when scanning for one line is performed into an analog electric signal by the photoelectric converter 110, for converting the analog electric signal into a digital electric signal (image information) by the succeeding A/D input CH 2*b*, and for storing the image information of the one line based on the digital electric signal in the image memory region of the memory 2*c* by attaching the above described identification information is repeated for each scanning for one line based on the laser light having the wavelength A or B. As a result, image information corresponding to the scanning for one line based on the laser lights having the wavelengths A and B, for example, image information of CH1-L1 (image information of the 1st line based on the laser light having the wavelength A), image information of CH2-L1 (image information of the 1st line based on the laser light having the wavelength B), image information of CH1-L2 (image information of the 2nd line based on the laser light having the wavelength A) . . . are alternately stored in the image memory region of the memory 2*c*. After all of the scanning for one frame based on the laser light having the wavelength A, and the scanning for one frame based on the laser light having the wavelength B are terminated, data construction is made based on their identification information. Then, a Frame image 202-a obtained based on the laser light having the wavelength A, and a Frame image 202-b obtained based on the laser light having the wavelength B, namely, image information of one frame, which corresponds to an observation specimen image obtained when the laser light having the wavelength A is irradiated, and image information of one frame, which corresponds to an observation specimen image obtained when the laser light having the wavelength B is irradiated are obtained.

As described above, according to the third preferred embodiment, the confocal laser scanning microscope apparatus that can make the 2-wavelength excitation 1-wavelength fluorescence measurement using the fluorescence dye fura-2 can be implemented. Additionally, a time lag from when the image information based on the laser light having the wavelength A is obtained until when the image information based on the laser light having the wavelength B is obtained becomes a time required to obtain image information of one line. As a result, a determinate quantity measurement of calcium ion concentration, etc. can be made in more real time.

This preferred embodiment is explained by taking the 2-wavelength excitation 1-wavelength fluorescence measurement as an example. As described above, identification information including a tag for identifying that image information is based on laser light having which wavelength and position information for identifying image information of which line is attached to the image information of one line stored in the memory 2c. Therefore, it goes without saying that this preferred embodiment is applicable also to a measurement using three types or more of laser lights having different wavelengths as excitation wavelengths.

Additionally, in this preferred embodiment, the switching of laser lights having different wavelengths is made by the laser light source device 4 for each scanning for one line. However, the switching may be made for each scanning for one pixel, or for each scanning for a predetermined range. In that case, position information for identifying which one pixel or which predetermined range may be included in identification information.

Next, a modification example of the third preferred embodiment according to the present invention is explained.

In the above described third preferred embodiment, data construction is made after all pieces of image information of one frame based on the laser light having the wavelength A, and image information of one frame based on the laser light having the wavelength B are stored in the memory 2c, frame images according to the respective pieces of constructed image information are displayed on the image monitor 5, and an image based on a result of the predetermined arithmetic operation using the respective pieces of constructed image information is displayed on the image monitor 5. In the meantime, in this modification example, each time image information obtained by scanning for one line based on the laser light having the wavelength A, and image information obtained by scanning for the same one line based on the laser light having the wavelength B are stored in the memory 2c, respective line images according to the image information respectively obtained by the scanning for one line are displayed on the image monitor 5, and a line image based on a result of a predetermined arithmetic operation using the image information respectively obtained by the scanning for one line is displayed.

Figure 6:
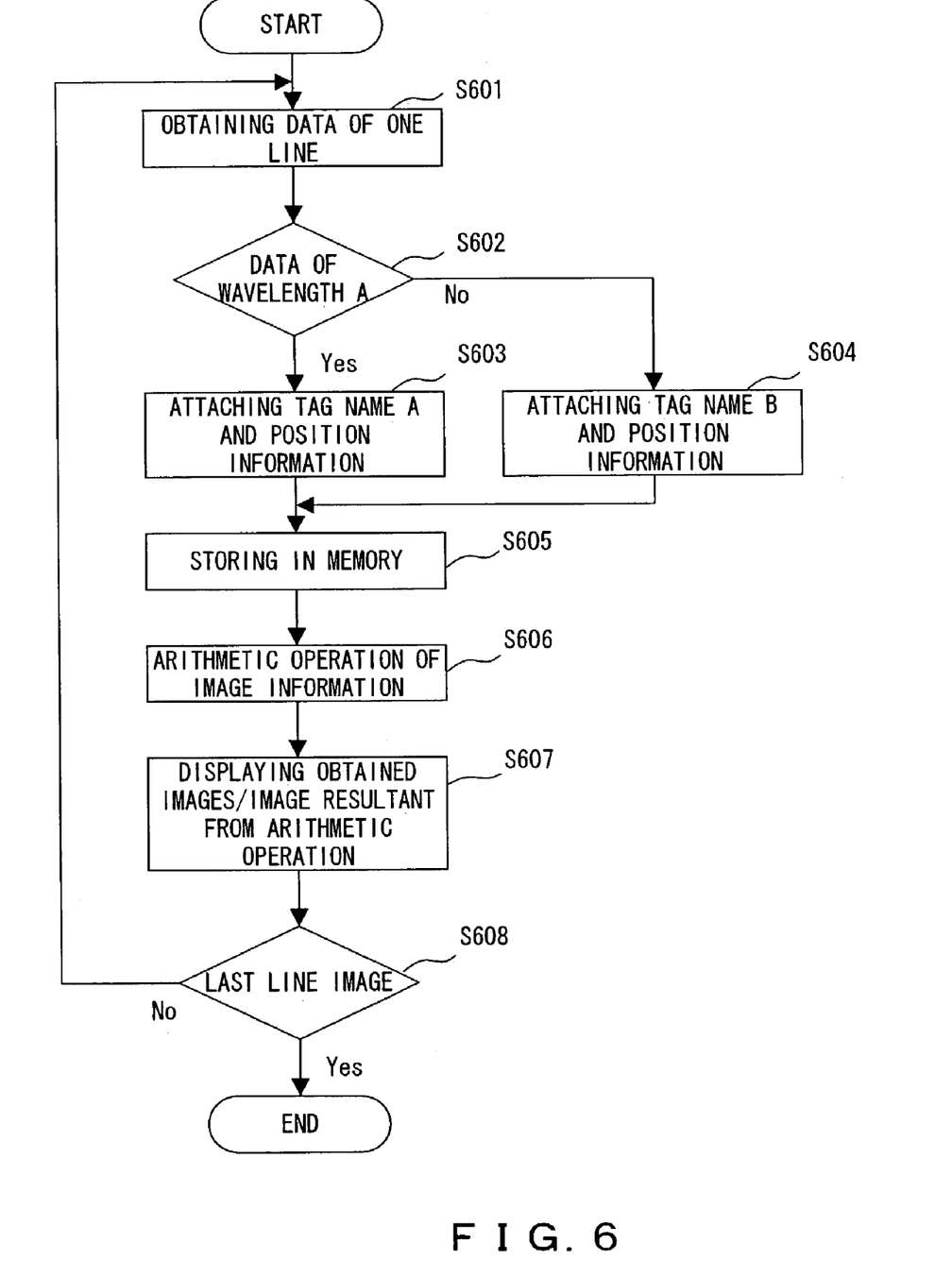
FIG. 6 is a flowchart showing the contents of a 2-wavelength excitation 1-wavelength fluorescence light measurement process according to a modification example of the third preferred embodiment of the present invention.

FIG. 6 is a flowchart which shows the contents of a 2-wavelength excitation 1-wavelength fluorescence measurement process which implements such a process according to this modification example, and corresponds to the above described FIG. 4. The calculating/processing unit 2a of the computer 2 reads and executes the control program 2d recorded on the above described recording medium not shown, whereby this measurement process is implemented.

In FIG. 6, firstly, in S601, image information obtained based on the laser light having the wavelength A, and image information obtained based on the laser light having the wavelength B are obtained for one line (the same line) to be scanned.

In S602, it is determined whether or not the respective pieces of image information obtained in the preceding step are obtained based on the laser light having the wavelength A. If a result of this determination is "Yes", the process proceeds to S603. If the result of the determination is "No", the process proceeds to S604.

In S603, identification information including a tag (a tag name A in this figure) indicating that the image information is obtained based on the laser light having the wavelength A and position information for identifying image information of which line is attached to the image information that is determined to be the image information obtained based on the laser light having the wavelength A in the preceding step.

In S604, identification information including a tag (a tag name B in this figure) indicating that the image information is obtained based on the laser light having the wavelength B and position information for identifying image information of which line is attached to the image information that is determined not to be the image information obtained based on the laser light having the wavelength A in S602.

In S605, the respective pieces of image information to which the identification information is attached in S603 and S604 are stored (held) in the memory 2c.

In S606, the above described predetermined arithmetic operation is performed with the respective pieces of image information stored in the memory 2c in the preceding step. Namely, the above described predetermined arithmetic operation is performed with the image information for the same line, which is obtained based on the laser light having the wavelength A, and the image information for the same line, which is obtained based on the laser light having the wavelength B.

In S607, respective images (line images) according to the respective pieces of image information stored in the memory 2c in S605, and an image (an image resultant from the line arithmetic operation) based on a result of the arithmetic operation, which is obtained in S606, is displayed on the image monitor 5.

In S608, it is determined whether or not the line image displayed in the preceding step is of the last line among lines to be scanned. If a result of this determination is "Yes", this flow is terminated. If the result of the determination is "No", the next line is recognized as a line to be scanned, and the process goes back to S601.

As described above, this flow is executed, whereby a line image according to image information obtained based on the laser light having the wavelength A, a line image according to the image information obtained based on the laser light having the wavelength B, and an image resultant from the line arithmetic operation based on a result of the above described predetermined arithmetic operation using the respective pieces of image information are displayed. Consequently, images and an arithmetic operation result can be displayed in more real time. Additionally, this flow explains the obtainment of image data of one frame. If this flow is repeated many times, a ratio measurement can be made in real time.

In this modification example, image information is obtained by each scanning for one line. However, the image information may be obtained by each scanning for one pixel. Namely, each time image information obtained by scanning for one pixel based on the laser light having the wavelength A, and image information obtained by scanning for the same one pixel based on the laser light having the wavelength B are stored in the memory 2c, respective pixel images according to the image information respectively obtained by the scanning for one pixel may be displayed on the image monitor 5, and an image resultant from a pixel arithmetic operation based on a result of the above described predetermined arithmetic operation using the image information respectively obtained by the scanning for one pixel may be displayed.

Figure 7:
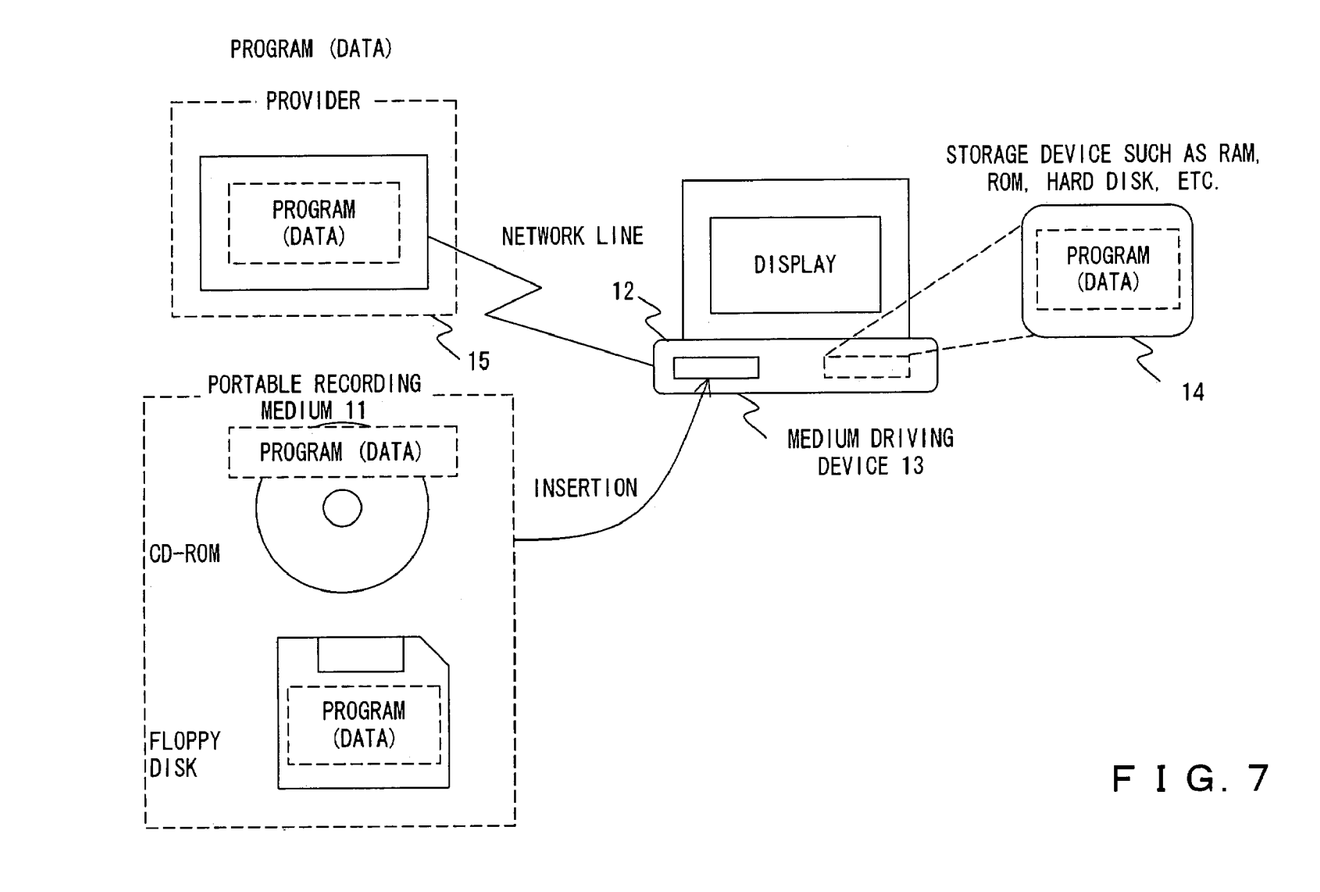
FIG. 7 exemplifies recording media on which a program is recorded.

Additionally, in the above described first to third preferred embodiments (including the above described modification example), the control process performed by the calculating/processing unit 2a that is comprised by the computer 2 of the confocal laser scanning microscope apparatus can be executed, for example, also by a computer shown in FIG. 7.

In this case, as shown in this figure, the program 2d executed by the calculating/processing unit 2a may be stored onto a portable storage medium 11 such as a CD-ROM, a floppy disk (or an MO, a DVD, a CD-R, a CD-RW, a removable hard disk, etc.), the portable storage medium 11 may be read by a medium driving device 13 of a computer 12, the read program may be stored in an internal memory (a RAM, a hard disk, etc.) 14 of the computer 12, and the program may be executed by the computer 12. Or, the program may be stored in a storage means (database, etc.) 15 within an external device (server, etc.) of an information provider, transferred to the computer 12 via a communication, stored in the internal memory 14, and executed by the computer 12. The program stored onto/in the portable storage medium/the external device may be intended to execute a portion of the control process performed by the above described calculating/processing unit 2a.

Furthermore, in the above described first to third preferred embodiments (including the above described modification example), the calcium ion concentration is obtained. However, an ion concentration of hydrogen, etc., a macromolecule concentration, or the like can be obtained in a similar manner.

Still further, in the above described first to third preferred embodiments (including the above described modification example), laser lights having different wavelengths are switched. However, laser lights having different intensities may be switched. In this case, intensity identification information which are intended to identify laser light having which intensity and a tag may be used instead of the above described wavelength identification information and tag.

As described above, the confocal laser scanning microscope apparatus, its image recording method, and a recording medium on which its program is recorded according to the present invention are explained in detail. However, the present invention is not limited to the above described preferred embodiments, and various types of improvements and modifications can be made in a scope which does not deviate from the gist of the present invention, as a matter of course.

As described in detail, according to the present invention, a confocal laser scanning microscope apparatus can be applied to a measurement using a plurality of lights having different wavelengths as excitation lights like a 2-wavelength excitation 1-wavelength fluorescence measurement, etc., which is applied to a measurement of intracellular ion concentration of calcium, hydrogen, etc., a macromolecule concentration, or the like.

What is claimed is:

1. An image recording method for use in a confocal laser scanning microscope apparatus, comprising:
   time-sequentially scanning a specimen with each of a plurality of laser lights each at least having different wavelengths as spotlight;
   detecting, with one photo-detector, light of a wavelength band common among respective lights emitted from the specimen in response to respective spotlights of the plurality of different wavelengths; and
   recording obtained image information after partitioning the image information into portions corresponding respectively to at least the plurality of laser lights used for scanning the specimen.

2. The image recording method according to claim 1, wherein:
   in the scanning, the specimen is scanned in pixels with each of the plurality of laser lights as spotlight; and
   in the recording, the image information is partitioned in pixels, and recorded.

3. The image recording method according to claim 2, further comprising:
   performing an arithmetic operation with the image information partitioned in pixels; and
   displaying a result of the arithmetic operation.

4. The image recording method according to claim 1, wherein:
   in the scanning, the specimen is scanned in lines with each of the plurality of laser lights as spotlight; and
   in the recording, the image information is partitioned in lines, and recorded.

5. The image recording method according to claim 3, further comprising:
   performing an arithmetic operation with the image information partitioned in lines; and displaying a result of the arithmetic operation.

6. The image recording method according to claim 1, wherein:
   the light having a common wavelength band emitted from the specimen is a fluorescent light with the same wavelength band generated by the same fluorescent reagent.

7. The image recording method according to claim 1 further comprising calculating an image information ratio by using pieces of the image information respectively in correspondence to the plurality of different wavelengths of light used for scanning the specimen, generating an image in a manner based on the ratio, and displaying the generated image.

8. A recording medium on which is recorded a program for causing a computer to execute an image recording control of a confocal laser scanning microscope apparatus, the image recording control comprising:
   time-sequentially scanning a specimen with each of a plurality of laser lights each at least having different wavelengths as spotlight;
   detecting, with one photo-detector, light of a wavelength band common among respective lights emitted from the specimen in response to respective spotlights of the plurality of different wavelengths with one photo-detector, based on each spotlight having one of the plurality of different wavelengths; and
   recording obtained image information after partitioning the image information into portions corresponding respectively to at least the plurality of laser lights used for scanning the specimen.

9. The recording medium according to claim 8, wherein:
   in the scanning, the specimen is scanned in pixels with each of the plurality of laser lights as spotlight; and
   in the recording, the image information is partitioned in pixels, and recorded.

10. The recording medium according to claim 8, wherein:
    in the scanning, the specimen is scanned in lines with each of the plurality of laser lights as spotlight; and
    in the recording, the image information is partitioned in lines, and recorded.

11. The recording medium according to claim 8, wherein:
    the light having a common wavelength band emitted from the specimen is a fluorescent light with the same wavelength band generated by the same fluorescent reagent.

12. The recording medium according to claim 8, wherein the image recording control further comprises calculating an image information ratio by using pieces of the image information respectively in correspondence to the plurality of different wavelengths of light used for scanning the specimen, generating an image in a manner based on the ratio, and displaying the generated image.

13. An image recording method for use in a confocal laser scanning microscope apparatus, comprising:
scanning a specimen with two laser lights each with a different wavelength in such a manner that each scanning line position is time-sequentially scanned by both of the laser lights each with a different wavelength before moving to a next scanning line position;
detecting a light having a common wavelength band emitted from the specimen with one photo-detector, based on scanning of the two laser lights each with a different wavelength; and
recording image information obtained by the photo-detector together with identification information including wavelength information and scanned position information of the used laser light.

14. An image recording method of a confocal laser scanning microscope apparatus, comprising:
scanning a specimen for each line with first and second laser lights of different wavelengths in a duplicated manner successively;
recording a first image information obtained by detecting light coming from the specimen when the specimen is scanned with the first laser light for said each line after attaching to first image identification information including wavelength information of the first laser light and scanned position information of the line scanned with the first laser light; and
recording a second image information obtained by detecting light coming from the specimen when the specimen is scanned with the second laser light for said each line after attaching to second image identification information including wavelength information of the second laser light and scanned position information of the line scanned with the second laser light.

15. An image recording method of a confocal laser scanning microscope apparatus, comprising:
scanning a specimen for each pixel with first and second laser lights of different wavelengths in a duplicated manner successively;
recording a first image information obtained by detecting light coming from the specimen when the specimen is scanned with the first laser light for said each pixel after attaching to first image identification information including wavelength information of the first laser light and scanned position information of the pixel scanned with the first laser light; and
recording a second image information obtained by detecting a light coming from the specimen when the specimen is scanned with the second laser light for said each pixel after attaching to the second image identification information including wavelength information of the second laser light and scanned position information of the pixel scanned for with the second laser light.

16. An image recording method for use in a confocal laser scanning microscope apparatus, comprising:
time-sequentially scanning a specimen with each of a plurality of laser lights each at least having different wavelengths as spotlight;
performing a 1-wavelength measurement by detecting, with one photo-detector, light of a wavelength band common among respective lights emitted from the specimen in response to respective spotlights of the plurality of different wavelengths; and
recording obtained image information after partitioning the image information into portions corresponding respectively to at least the plurality of laser lights used for scanning the specimen.

17. The image recording method according to claim 16, wherein:
light emitted from the specimen is fluorescence emitted based on one kind of fluorescence dye.

18. The image recording method according to claim 16 further comprising calculating an image information ratio by using pieces of the image information respectively in correspondence to the plurality of different wavelengths of light used for scanning the specimen, generating an image in a manner based on the ratio, and displaying the generated image.

* * * * *